UNITED STATES PATENT OFFICE.

GEORG WICHMANN, OF BERLIN, GERMANY, ASSIGNOR TO CHEMISCHE FABRIK AUF ACTIEN, (VORM. E. SCHERING,) OF BERLIN, GERMANY.

ALKALINE ALBUMOSE-SILVER COMPOUND.

1,002,547.     Specification of Letters Patent.     Patented Sept. 5, 1911.

No Drawing.     Application filed March 18, 1909. Serial No. 484,268.

*To all whom it may concern:*

Be it known that I, GEORG WICHMANN, doctor of philosophy, chemist, citizen of the German Empire, residing at Berlin, Kingdom of Prussia, German Empire, have invented a new and useful Improvement in Alkaline Albumose-Silver Compounds, of which the following is a specification.

I have discovered that when the double compounds obtained from silver salts and such organic bases as are not corrosive and toxic, such as ethylenediamin, piperazin and the like, are acted upon by albumoses, easily soluble alkaline albumose silver compounds are obtained.

The albumose employed for the production of this new compound is that which is obtained by the action of a digestive ferment, such as pepsin or pancreatin, or a suitable acid, or superheated water upon albumen which is derived from meat and is soluble in water.

In order to obtain the new albumose silver compounds, the aqueous solution of the albumoses is mixed with a solution of the double compound of a silver salt and an organic base, the solution being then evaporated or precipitated by the addition of alcohol or other suitable agent.

Examples.

1. *Silver nitrate ethylenediamin albumose.*—11.4 grams albumose are dissolved in 25 grams of water and mixed with 16.4 cubic centimeters of silver nitrate ethylenediamin solution (known as argentamin). The mixture being then evaporated to dryness *in vacuo*. The product obtained contains 7% of silver.

2. *Silver carbonate ethylenediamin albumose.*—2 grams of silver nitrate are transformed into moist silver carbonate, and washed with a little water, dilute ethylenediamin being added until a colorless solution is obtained (about 1.6 cubic centimeters of 70% ethylenediamin will be required). The small quantity of silver which precipitates is separated by filtration, and the filtrate is mixed with a solution of 8.8 grams of albumose in 25 cubic centimeters of water and the mixture brought to dryness *in vacuo*. It contains 11% silver.

3. *Silver phosphate ethylenediamin albumose.*—Silver phosphate (obtained by precipitating with sodium phosphate from an aqueous solution containing 2 grams of silver nitrate and then washing) is mixed with some water and dissolved by the addition of about 2 cubic centimeters of 70% ethylenediamin, to the filtered solution is added 8.8 grams albumose mixed in a little water. The evaporated compound contains 10.7% silver.

4. *Silver nitrate piperazin albumose.*—A concentrated aqueous solution of 2.5 grams silver nitrate is poured into a solution of 5.1 grams piperazin (50%) in 15 cubic centimeters water and mixed with 11 grams albumose in 30 cubic centimeters water. A product containing 9.8% of silver is obtained by evaporating this mixture *in vacuo*.

In place of employing the solution of a double compound of a silver salt and an organic base the compound may be isolated as a solid and then employed for the manufacture of albumose compounds.

For the production of these solid compounds the silver salt is preferably employed in the form of a fine powder, or dissolved in a little water or alcohol, and introduced into the organic base which is as free from water as possible. The resulting compound is precipitated in crystalline form by adding alcohol and the mother liquor is removed in any suitable way.

The products obtained according to these processes are light to dark brown powders which dissolve easily in water with an alkaline reaction. The antiseptic power of these alkaline solutions is very considerably greater than that of mere aqueous silver solutions containing the same amount of silver.

Special silver reagents such as common salt, sulfureted hydrogen do not give a precipitate with the solutions of the new silver compounds. Dilute acids such as acetic acid, hydrochloric acid, nitric acid, sulfuric acid give precipitates which however again dissolve in large excess of acid.

I claim as my invention:

1. The herein described alkaline albumose silver compounds obtained from the action of albumose which is soluble in water and derived from meat albumen upon a silver salt and an organic base which is not corrosive or toxic, such compounds being brownish powders which are readily soluble in water with an alkaline reaction, do not give a precipitate with silver reagents, carbonize upon heating, and from which the organic base is driven off by distillation.

2. The herein described silver salt-ethylenediamin-albumose compounds, being brownish powders which are readily soluble in water with an alkaline reaction, do not give a precipitate with silver reagents, carbonize upon heating, and from which the organic base is driven off by distillation.

3. The process of manufacturing alkaline albumose silver compounds which consists in causing albumose which is soluble in water and derived from meat albumen to act upon a double compound comprising a silver salt and a non-corrosive, non-toxic organic base, substantially as described.

4. The process of manufacturing silver salt-ethylenediamin-albumose compounds, which consists in causing albumose which is soluble in water and derived from meat albumen to act upon a double compound comprising a silver salt and ethylenediamin, substantially as described.

5. The process of manufacturing alkaline albumose silver compounds, which consists in mixing a solution of albumose which is soluble in water and derived from meat albumen with a solution of a double compound comprising a silver salt and a non-corrosive, non-toxic organic base, and evaporating the solution, substantially as described.

In testimony whereof I hereunto set my hand in the presence of two subscribing witnesses.

GEORG WICHMANN.

Witnesses:
HENRY HASPER,
WOLDEMAR HAUPT.